United States Patent [19]

Ishiwata

[11] Patent Number: 4,670,330

[45] Date of Patent: Jun. 2, 1987

[54] MOISTURE-PERMEABLE, ANTISTATIC, AND OIL-RESISTANT WORK GLOVES AND PRODUCTION OF THE SAME

[75] Inventor: Seihei Ishiwata, Maebashi, Japan

[73] Assignee: Dia Rubber Company, Ltd., Maebashi, Japan

[21] Appl. No.: 772,412

[22] Filed: Sep. 4, 1985

[30] Foreign Application Priority Data

Dec. 21, 1984 [JP] Japan ................ 59-268231

[51] Int. Cl.$^4$ .............. C08G 18/48; A41D 19/00; B32B 27/00

[52] U.S. Cl. .............. 428/290; 528/71; 528/904; 428/304.4; 428/318.6; 428/319.7; 2/161 R; 2/167; 2/168

[58] Field of Search ........... 528/71, 904; 521/905; 428/290, 304.4, 318.6, 319.7; 2/161 R, 167, 168

[56] References Cited

U.S. PATENT DOCUMENTS

| | | | |
|---|---|---|---|
| 2,293,927 | 8/1942 | Beal | 428/318.6 |
| 3,384,606 | 5/1968 | Dieterich et al. | 528/71 |
| 3,895,134 | 7/1975 | Kigane et al. | 521/905 |
| 4,086,193 | 4/1978 | Reischl | 528/71 |
| 4,277,380 | 7/1981 | Williams et al. | 528/71 |
| 4,408,008 | 10/1983 | Markusch | 528/71 |
| 4,463,156 | 7/1984 | McGary et al. | 528/65 |
| 4,515,851 | 5/1985 | Johnson | 428/304.4 |

OTHER PUBLICATIONS

Thomas' Register, 1986, gloves and mittens section.

*Primary Examiner*—Herbert S. Cockeram
*Attorney, Agent, or Firm*—Oblon, Fisher, Spivak, McClelland & Maier

[57] ABSTRACT

There are provided moisture-permeable, antistatic, and oil-resistant work gloves made of film of water-insoluble, hydrophilic polyurethane resin having hydrophilic groups and/or hydrophilic segments in the main chains and/or side chains. They are produced by applying an organic solvent solution of water-insoluble, hydrophilic polyurethane resin having hydrophilic groups and/or hydrophilic segments in the main chains and/or side chains, to the surface of a glove form or the surface of a glove form on which is put a glove substrate, drying the applied solution, and stripping the deposit film from the form.

6 Claims, No Drawings

MOISTURE-PERMEABLE, ANTISTATIC, AND OIL-RESISTANT WORK GLOVES AND PRODUCTION OF THE SAME

BACKGROUND OF THE INVENTION

1. Field of the Invention

The present invention relates to flexible, moisture-permeable, antistatic, and oil-resistant work gloves and to a process for producing the same.

2. Description of the Prior Art

Work gloves used up to now were made of rubber, vinyl chloride resin, or polyurethane resin.

Conventional work gloves made of rubber or vinyl chloride resin lack oil-resistance, flexibility, antistatic properties, and feeling. In addition, they become brittle, losing flexibility and strength, when used in cold districts.

In order to overcome these disadvantages, there was proposed work gloves made of polyurethane resin. However, they lack moisture permeability like the ones made of rubber and hence become sweaty soon after they are worn. Not only does this make the gloves feel unpleasant but also this causes the gloves to slip off during working, endangering the safety of the user.

On the other hand, work gloves used for IC production of medical treatment are required to have antistatic properties, and there is an increasing demand for such gloves. Thus there has been a strong demand for work gloves having antistatic properties in addition to the general performance such as moisture permeability and oil resistance.

SUMMARY OF THE INVENTION

In order to overcome the above-mentioned disadvantages involved in the conventional technology, the present inventors carried out a series of researches, which led to the findings that their object can be achieved by selecting specific materials for the production of work gloves. The present invention was completed based on these findings.

The gist of this invention resides in moisture-permeable, anti-static, and oil-resistant work gloves made of a film of water-insoluble, hydrophilic polyurethane resin having hydrophilic groups and/or hydrophilic segments in the main chains and/or side chains.

DETAILED DESCRIPTION OF THE INVENTION

The polyurethane resin used in this invention is a water-insoluble, hydrophilic polyurethane resin having hydrophilic groups and/or hydrophilic segments in the main chains and/or side chains. Work gloves made of this polyurethane resin are superior in oil-resistance, flexibility, feeling, and strength to the conventional work gloves made of rubber or vinyl chloride resin. In addition, the work gloves of this invention have good moisture permeability unlike those which are made of the conventional polyurethane resin. Moreover, the work gloves of this invention have good antistatic properties because the above-specified hydrophilic polyurethane resin permits the gloves to absorb a certain amount of moisture in the atmosphere at all times.

The above-specified polyurethane resin can be obtained by introducing hydrophilic groups such as hydroxyl group, carboxyl group, sulfonic group, amide group, and amino group into the side chains of a known polyurethane resin, or by introducing hydrophilic segments such as polyoxyethylene into the main chains of a known polyurethane resin.

The present inventors' investigation indicates that the polyurethane resin produced as mentioned above becomes hydrophilic and finally water soluble as the amount of the hydrophilic groups or segments increases. However, the polyurethane resin used in this invention should be hydrophilic and yet insoluble in water. This requirement is achieved by properly regulating the amount of the hydrophilic groups and/or hydrophilic segments to be introduced. It was unexpectedly found that such water-insoluble and hydrophilic polyurethane exhibits outstanding moisture permeability and antistatic properties when made into film.

The amount of the hydrophilic groups and/or hydrophilic segments to be introduced cannot be established unconditionally, because these groups and segments differ in properties from one type to another. However, the introduction of such groups or segments can be readily accomplished by the known technology, and the required amount will be experimentally established with ease by those who are skilled in the art.

The introduction of hydrophilic groups into the side chains may be accomplished by, for example, grafting a monomer having a hydrophilic group onto a hydrophobic polyurethane resin. Examples of such monomers include (meth)acrylic acid, polyol mono(meth)acrylate composed of (meth)acrylic acid and polyol, (meth)acrylate having an amino group (e.g., N-mono- or N-dialkylethyl(meth)acrylate), polyethylene glycol(meth)acrylamide (or methylol derivative thereof), aminostyrene, sulfonated styrene, vinylsulfonic acid, vinyl pyridine, and vinyl quinoline. The introduction of hydrophilic segments into the main chains may be accomplished by, for example, substituting polyethylene glycol or polyester polyol composed of polyethylene glycol and polybasic carboxylic acid for all or a part of the polyol used as a raw material of polyurethane resin. Any other known methods can also be used to render polyurethane resin hydrophilic.

The water-insoluble, hydrophilic polyurethane resin prepared as mentioned above is made into the moisture-permeable, antistatic, oil-resistant work gloves of this invention according to the method mentioned below. At first, the polyurethane resin is dissolved in a proper organic solvent or mixed solvent such as dimethylformamide, methyl ethyl ketone, toluene, and xylene to make a 5 wt% to 25 wt% solution. (A solution of polyurethane resin may also be prepared by synthesizing a water-insoluble, hydrophilic polyurethane resin in an organic solvent.) The solution of polyurethane resin thus prepared is then applied to the surface of a hand form made of metal or porcelain. After drying, a deposited layer is stripped from the form.

According to a preferred process of this invention, the solution of polyurethane resin is applied directly to a hand form as mentioned above. In this way it is possible to produce work gloves made of polyurethane resin alone.

According to another preferred process of this invention, a glove made of cloth or other materials is previously put on the hand form and then the glove is impregnated with the solution of polyurethane resin. In this way it is possible to produce work gloves composed of cloth substrate and polyurethane resin.

According to still another preferred process of this invention, the above-mentioned cloth substrate may be substituted by a breathable sponge layer made of polyurethane resin or vinyl chloride resin. In this way it is possible to produce thick work gloves.

In addition to the above-mentioned preferred processes of this invention, any other known methods which do not employ hand forms can be used to produce the gloves of this invention.

The film of polyurethane resin to be formed on the hand form should have a proper thickness of 10 to 50 μm to ensure a desirable degree of moisture permeability, e.g., 3,000 to 5,000 g/m$^2$/24 hrs (measured according to JIS Z-0208B). If it is excessively thick, the resulting work gloves have a low degree of moisture permeability; and if it is excessively thin, the resulting gloves are poor in other properties such as strength.

Needless to say, the polyurethane resin solution may be incorporated with known additives such as coloring agent, antioxidant, plasticizer, and age resistor.

As mentioned above, the present invention provides work gloves which are superior in moisture permeability, antistatic properties, oil resistance, flexibility, feeling, and strength to those made of conventional rubber, vinyl chloride resin, or polyurethane resin.

The invention is illustrated with the following examples, in which "parts" and "%" are by weight.

EXAMPLE 1

130 parts of polytetramethylene glycol (PTG) having a molecular weight of 2,000, 20 parts of polyethylene glycol (PEG) having a molecular weight of 2,000, 10 parts of 1,4-butanediol (1,4BD), and 50 parts of hydrogenated diphenylmethane-4,4'-diisocyanate (MDI) were reacted with one another at 100° C. for 10 hours. The reaction product was diluted with a 70:30 mixed solvent of dimethylformamide and toluene to make a 25% solution. This solution, designated as solution A, had a viscosity of 120 poise at 20° C.

EXAMPLE 2

100 parts of 1,4-butane-ethylene adipate (1,4BD/EG=50/50 mol) having a molecular weight of 2,000, 30 parts of PTG having a molecular weight of 2,000, 20 parts of PEG having a molecular weight of 2,000, 10 parts of 1,4BD, and 50 parts of MDI were reacted with one another at 70° C. for 2 hours. The reaction product was diluted with a 60:40 mixed solvent of dimethylformamide and methyl ethyl ketone to make a 30% solution. This solution, designated as solution B, had a viscosity of 450 poise at 20° C.

EXAMPLE 3

150 parts of 1,4-butane-ethylene adipate (1,4BD/EG=50/50) having a molecular weight of 2,000, 15 parts of EG, and 50 parts of MDI were reacted with one another at 70° C. for 5 hours, and then at 90° C. for 2 hours. A portion of the reaction product was diluted with a 60:40 mixed solvent of dimethyl formamide and methyl ethyl ketone to make a 30% solution. This solution, designated as solution C, had a viscosity of 480 poise at 20° C. The remainder was diluted with dimethylformamide to make a 30% solution. This solution, designated as solution D had a viscosity of 520 poise at 20° C.

EXAMPLE 4

100 parts of solution A was diluted with 50 parts of a 50:50 mixed solvent of xylene and toluene. The resulting solution had a viscosity of 1180 cps. 100 parts of solution B was diluted with 70 parts of a 50:50 mixed solvent of xylene and toluene. The resulting solution had a viscosity of 970 cps. 100 parts of solution C was diluted with 70 parts of a 50:50 mixed solvent of xylene and toluene. The resulting solution had a viscosity of 1060 cps.

Each of the diluted solutions thus prepared was placed in a dipping vat kept at 30° to 35° C., followed by complete defoaming. A porcelain dipping mandrel (hand form) was slowly dipped in the solution and then withdrawn from the solution. When there was no dripping any longer, the dipping mandrel was inverted and placed in a drier having a temperature gradient of 70° to 100° C. for 20 minutes. The dipping-drying process was performed once for one batch and repeated twice for the other batch. After drying and cooling (below 40° C.), the glove formed on the mandrel was stripped off. No pinholes were detected on the stripped glove. The glove formed in one step had a film thickness of 10 to 15 μm; and the glove formed in two steps had a film thickness of 20 to 30 μm.

Table 1 shows the moisture permeability and feeling of the gloves produced in this example.

TABLE 1

| Raw material | Moisture permeability* | | Feeling** |
|---|---|---|---|
| | One-step forming | Two-step forming | |
| Solution A | 4200–4600 | 3600–4000 | Excellent |
| Solution B | 3700–4100 | 2800–3200 | Good |
| Solution C*** | 300–500 | 300–500 | Poor |

*g/m$^2$/24 hrs, according to JIS Z0208B.
**Evaluated by 10 panelists.
Excellent: recognized by 8 or more panelists
Good: recognized by 5 or more panelists
Fair: recognized by 3 or more panelists
Poor: recognized by no panelists
***Comparative Example The antistatic properties of the gloves were evaluated by rubbing one glove against the other in an atmosphere of 50%RH and observing how the rubbed gloves attract dust. Gloves made of solution A and solution B did not attract dust at all, indicating that they had good antistatic properties. On the other hand, gloves made of solution C attracted a great deal of dust, indicating that they had insufficient antistatic properties.

EXAMPLE 5

A dipping solution was prepared by compounding 100 parts of solution D with 50 parts of dimethylformamide, 2 parts of Leathermine W-T-30 (made by Dainichiseika Co., Ltd.), and 10 parts of Seika Seven BS-1470-Yellow (made by Dainichiseika Co., Ltd.). This dipping solution was placed in a dipping vat kept at 30° to 35° C., followed by complete defoaming.

A knitted cotton glove, which had previously been dipped in water, was put on a stainless steel dipping mandrel. The mandrel was slowly dipped in the dipping solution prepared as mentioned above and slowly withdrawn. When there was no dripping any longer, the dipping mandrel was placed in a water bath at 20° to 25° C. for wet gelling for 30 minutes and then in a water bath at 60° to 70° C. for about 1 hour for the removal of DMF. The glove formed on the mandrel was stripped off, followed by dewatering by a vacuum dehydrator. The glove was put on the mandrel again and dried in a drier at 90° to 100° C. for 20 minutes.

The glove thus obtained was good in flexibility and moisture permeability, but was not good in oil resistance, because it is made of wet process porous layer alone. To impart oil resistance, the glove was treated once with solution A, B, or C as in Examples 1 to 3. There were obtained soft gloves having a high surface gloss. Table 2 shows the moisture permeability and feeling of the gloves thus obtained.

TABLE 2

| Structure of layer | Moisture permeability* | Feeling** |
| --- | --- | --- |
| Wet process porous layer alone | 8800 | Excellent |
| Wet process porous layer + solution A | 4400 | Excellent |
| Wet process porous layer + solution B | 3800 | Excellent |
| Wet process porous layer + solution C | 700 | Poor |

*g/m$^2$/24 hrs, according to JIS Z0208B.
**Evaluated in the same manner as mentioned in Table 1.

The antistatic properties of the gloves were evaluated by rubbing one glove against the other in an atmosphere of 50%RH and observing how the rubbed gloves attract dust. Gloves made of solution A and solution B did not attract dust at all, indicating that they had good antistatic properties. On the other hand, gloves made of solution C attracted a great deal of dust, indicating that they had insufficient antistatic properties.

What is claimed is:

1. Moisture-permeable, antistatic, and oil-resistant work gloves made of a film of water-insoluble, hydrophilic polyurethane resin having hydrophilic groups and/or hydrophilic segments in the main chains and/or side chains prepared by deposition from a non-aqueous organic solvent.

2. Gloves as claimed in claim 1, wherein the polyurethane film is formed on a substrate.

3. Gloves as claimed in claim 1, wherein the hydrophilic group is a carboxyl group or sulfonic group or an alkaline metal salt thereof.

4. Gloves as claimed in claim 1, wherein the hydrophilic segment is a polyoxyethylene chain.

5. Gloves as claimed in claim 2, wherein the substrate is a glove made of cloth or breathable synthetic resin.

6. Gloves as claimed in claim 1, wherein the polyurethane film has a thickness of 10 to 50 μm.

* * * * *